United States Patent [19]
Bishop

[11] Patent Number: 5,662,436
[45] Date of Patent: Sep. 2, 1997

[54] ROTATING TOOL STAR SHAPED HOLDING MEMBER INTERFITTED TO INSERT MOUNTING DISK

[75] Inventor: Todd N. Bishop, P.O. Box 6170, Bellingham, Wash. 98226

[73] Assignee: Todd N. Bishop, Bellingham, Wash.

[21] Appl. No.: 558,249

[22] Filed: Nov. 17, 1995

Related U.S. Application Data

[63] Continuation-in-part of Ser. No. 225,958, Apr. 8, 1994, abandoned.

[51] Int. Cl.⁶ .................... B23C 5/06; B23C 5/22
[52] U.S. Cl. .................. 407/35; 407/42; 407/48; 407/61; 409/345
[58] Field of Search .................. 407/32, 35–39, 407/42, 48–52, 58, 59, 61, 103, 21; 144/117 R, 118, 119 R, 231–235; 409/345; 408/231–233

[56] References Cited

U.S. PATENT DOCUMENTS

| | | |
|---|---|---|
| 499,246 | 6/1893 | Peyton . |
| 777,250 | 12/1904 | Eynon . |
| 947,319 | 1/1910 | Wells . |
| 1,460,030 | 6/1923 | Mattson . |
| 1,714,036 | 5/1929 | Miller . |
| 2,751,663 | 6/1956 | Leuzinger . |
| 2,805,467 | 6/1957 | Greenleaf . |
| 3,104,453 | 9/1963 | Greenleaf .................. 407/49 |
| 3,323,194 | 6/1967 | Greenleaf .................. 407/52 |
| 3,733,665 | 5/1973 | Spriggs . |
| 3,831,237 | 8/1974 | Gonsalus . |
| 4,193,719 | 3/1980 | Oaks . |
| 4,449,556 | 5/1984 | Colton . |
| 5,059,068 | 10/1991 | Scott .................. 407/9 |

FOREIGN PATENT DOCUMENTS

494225  3/1976  U.S.S.R. .................. 407/103

*Primary Examiner*—Daniel W. Howell
*Assistant Examiner*—Kenneth J. Hansen

[57] ABSTRACT

An improved cutting tool having a cutting insert mounting member and a star shaped cutter insert holding member of similar diameter: the two members when interfitted, secure a plurality of cutting inserts about the outer circumference of the assembled tool. Secure clamping of the cutters is achieved through both axial and radial clamping forces generated by the action of the holding member. Additional radial and axial clamping forces are exerted on the cutting inserts by centripetal acceleration acting on the members during operation. Depth limiters devices that mount in the tool act as skids on the work surface to control the aggressiveness of the cut. An isolation mechanism may be included to eliminate oscillations transmitted by the hand held power unit to the cutting tool.

44 Claims, 8 Drawing Sheets

ROTATING TOOL STAR SHAPED HOLDING MEMBER INTERFITTED TO INSERT MOUNTING DISK

This application is a continuation-in-part of Ser. No. 08/225, 958, filed Apr. 8, 1994, now abandoned.

BACKGROUND

1. Field of the Invention

The invention relates to improvements to a rotating cutting head with general utility, but more particularly to an improved tool for use in hand-held applications for surface stripping or shaping. A novel cutting insert clamping method particularly suited to high rotational speeds is described.

2. Description of Prior Art

Rotary cutters are currently used by the public for both stationary and hand portable applications such as wood planing, paint removal, animal hoof trimming and metal machining. They often utilize replaceable and indexable carbide inserts for cutting. Upon information and beliefs, normal methods for securing cutting-inserts to the rotating head include the use of center screws or other small mechanical parts. In this application, these are slow to use, subject to damage or loss of small parts, may come loose during operation—endangering the operator, and are more detailed and expensive to manufacture. For optimum efficiency, many materials must be machined at extremely high rotational speeds. A method for holding said inserts is needed that is secure, with minimal potential for disintegration under extreme radial loads. This invention produces high clamping pressures on the installed insert under static conditions and has mechanisms that increase the pressure under radial load. The invention requires no small parts at the periphery of the tool, is easier and simpler for the operator to handle, and can be produced less expensively because fewer parts are required.

When mounting a solid cutting tool to a portable power unit such as an electric grinder, lateral oscillations in the rotating shaft result in an up and down motion normal to the plane of the cutting head, resulting in rough cutting action unless an isolation member is inserted between the shaft and the body of the tool.

SUMMARY OF THE INVENTION

The invention relates to improvements to a disk-shaped rotating cutting head including:

(1) A means of securing all cutting-inserts by the placement of a one-piece, star-shaped cutting-insert holding member which is held in place via a shaft nut or other securing means such as bolts, pins or toggle locks, such as a spanner nut commonly used on portable grinders. By this method, all parts are held in place with a single, self-tightening member that eliminates small moving or threaded parts. When assembled, the two major body parts of the tool which are a cutting-insert holding member and a cutting-insert mounting structure of the planing head fit together to form what is functionally a single unit.

(2) The radial protrusions of the star shaped member may be formed axially at the root of said protrusions such that the star shaped member forms a shallow bowl. This may be of frusto conical or other configurations such as a segment of a sphere. The root of the protrusions is flexible so that the bowl shape is reformed into an essentially flattened disk shape during interfitting and securing of the star shaped member to the cutting insert holding member. This deformation causes the free end of the protrusions to be forced radially outward into the cutting insert mounting pocket during interfitting, further clamping the inserts.

(3) The radial neutral axis of the radial protrusions is shifted so that forces resulting from centripetal acceleration result in a moment, forcing the free end of the protrusion toward the cutting insert clamping pocket causing clamping forces on the insert to increase with rotation.

(4) The material of the protrusions may deform outward under radial loads, further increasing the clamping forces acting on the inserts.

(5) An elastomeric isolation member positioned between a shaft of a portable grinder and the assembled planing head absorbs minor lateral oscillations inherent in most portable grinder shafts and compensates for minor movements by the operator during hand-held use.

(6) Wear-resistant skids (plunge limiters) that function like rakes on a chain-saw blade, to control and adjust the aggressiveness of the cutting action. Said plunge limiters may be either round or eccentrically-shaped depending on the application; are mounted in alternating positions with the cutting-inserts, and are slightly smaller in diameter than the cutting-inserts, limiting the cutting depth of the rotating edges.

(7) A wear-resistant, dome-shaped high point center rest to protrude axially at the center of the major plane of the annular shaped cutting tool (i.e., at the center of rotation) to provide a resting place for the operator when the equipment is in use, thus allowing positive control of depth of cut. Said center rest height is adjustable relative to the cutting edges by adding or removing washers beneath the bearing flange of the shaft nut.

DESCRIPTION OF THE PREFERRED EMBODIMENT

Figure 1:
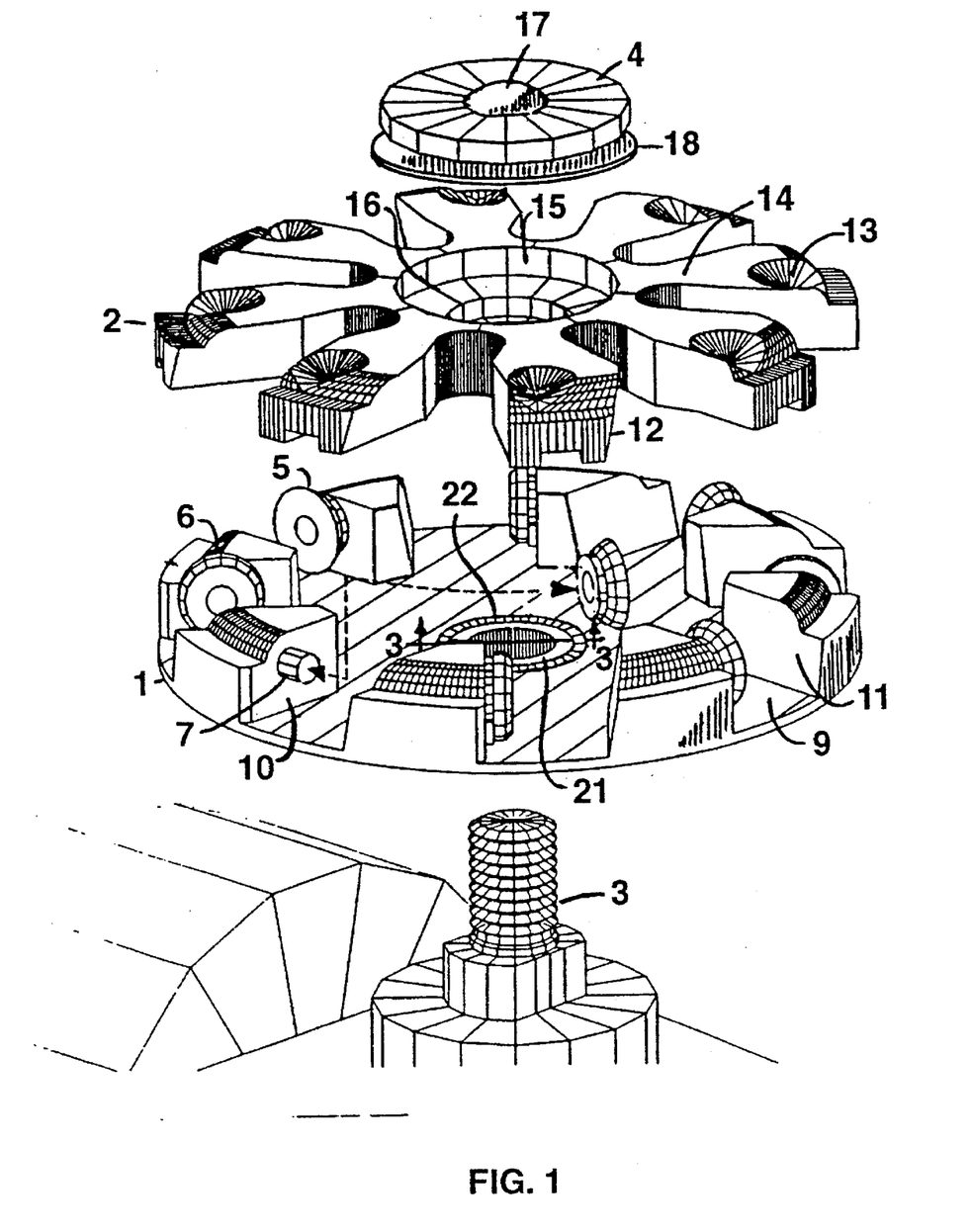
FIG. 1 shows a three-dimensional exploded front elevation showing the relative position of all parts of the disassembled cutting tool.
Figure 2:
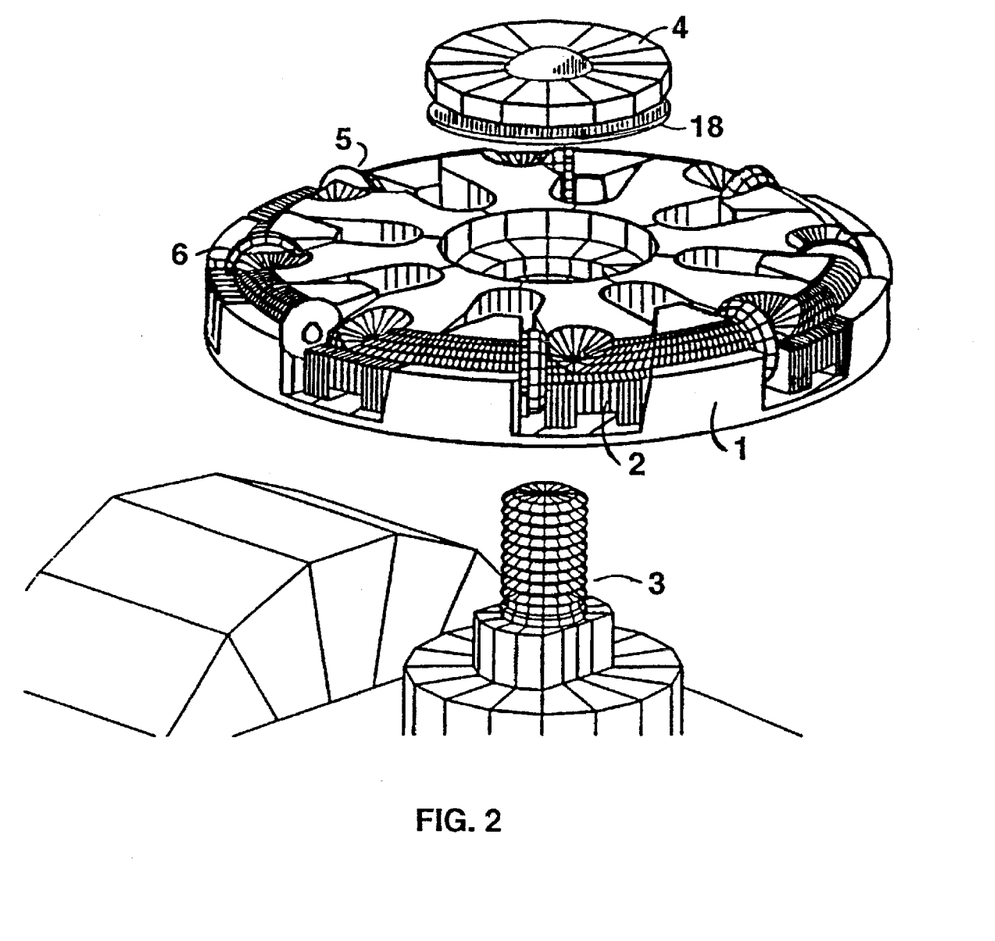
FIG. 2 shows a three-dimensional view of the assembled tool as mounted on a commercially available hand-held power unit.
Figure 7:
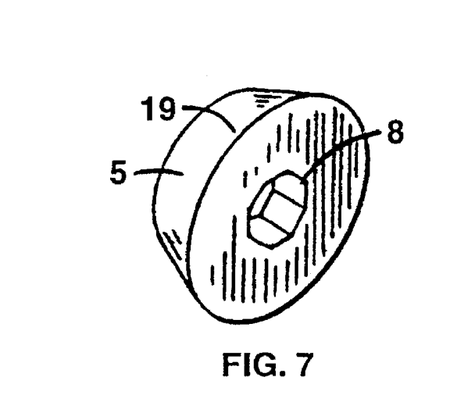
FIG. 7 shows a three-dimensional front elevation of a cutting-insert.
Figure 8:
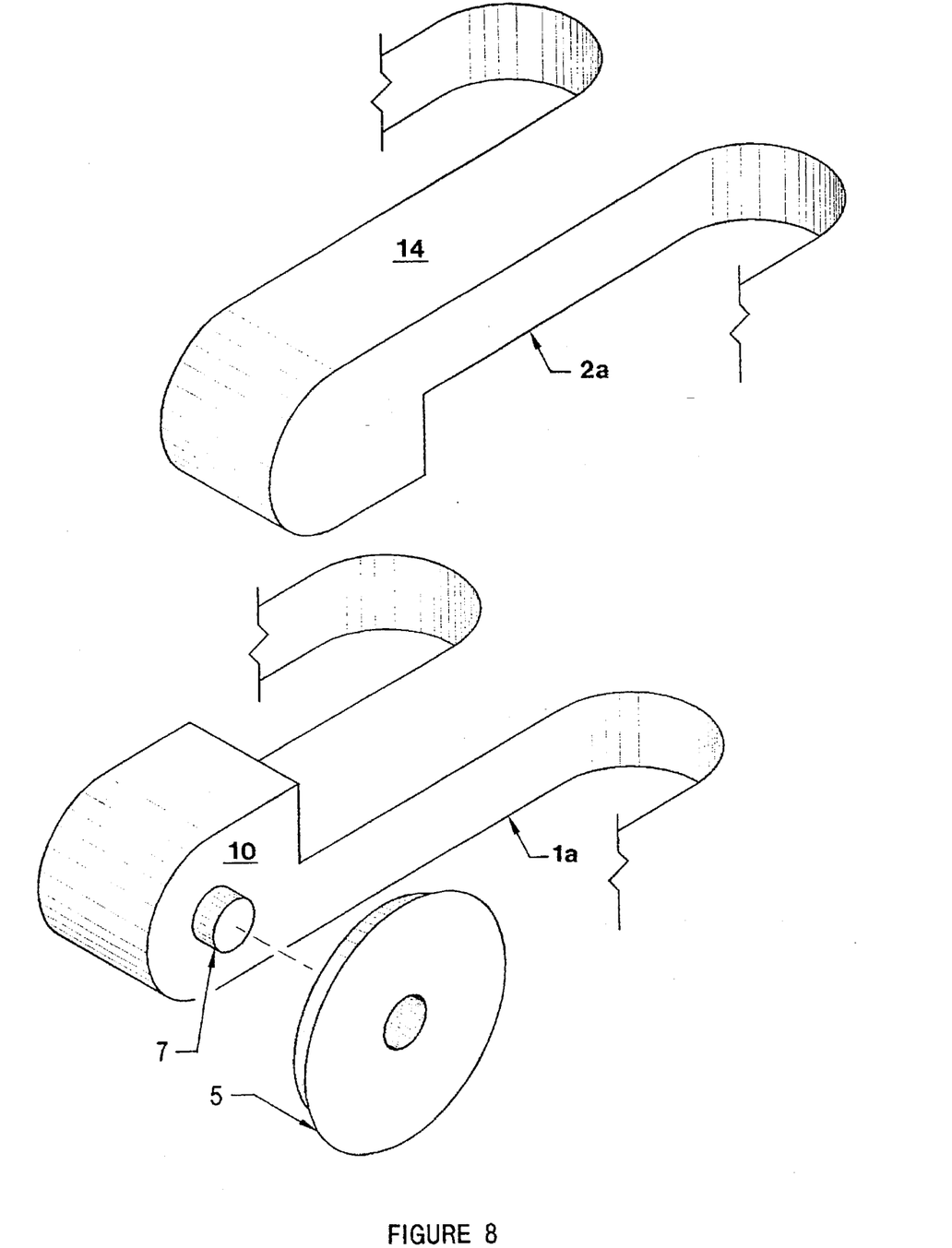
FIG. 8 is a partial perspective view of a slot cutting embodiment of the invention having two interfitting disk members.
Figure 9:
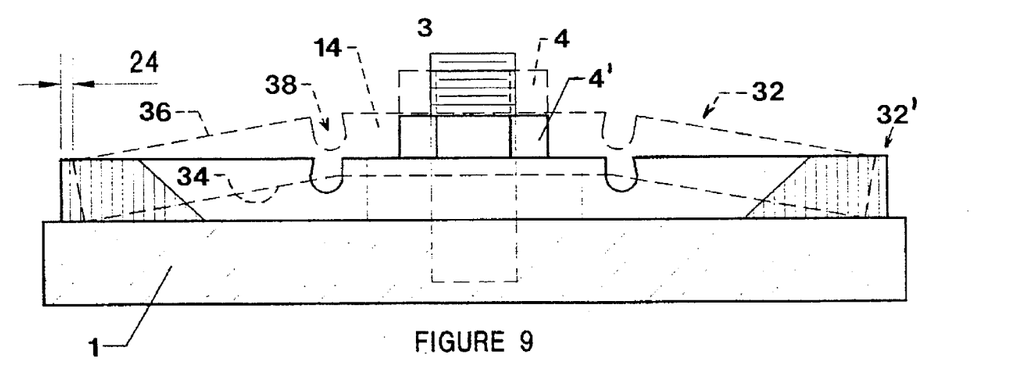
FIG. 9 shows a substantially frusto-conical dished second disk cutting insert clamping member having radially projecting protrusions being weighted such that the neutral axis is shifted when tightened for use.
Figure 10:
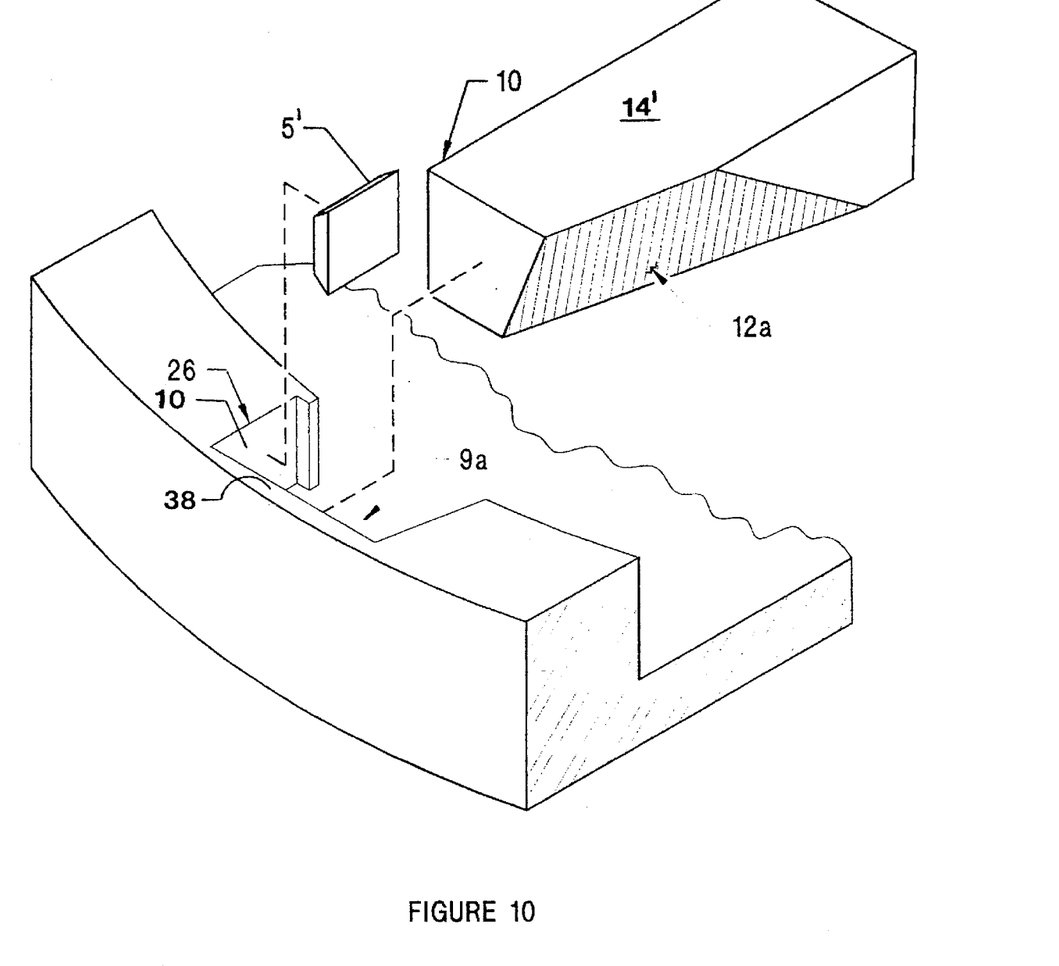
FIG. 10 is a fragmentary view showing a first disk shaped member having a non-segmented axially projecting rim comprising a blind cutting insert mounting pocket.

A typical embodiment of the cutting head is illustrated in FIGS. 1 through 7. FIGS. 8 through 10 illustrate alternate features of the invention. The disassembled face planing head is illustrated in FIG. 1. The assembled face planing head is illustrated in FIG. 2. The face planing head consists of a cutting-insert mounting structure 1, and a cutting-insert holding member 2, mounted on a power unit 3 and secured by a shaft nut 4. Cutting inserts 5 and optional plunge limiters 6 are held securely in place by the blocking action of the cutting-insert holding member and indexing and positioning pins 7. These pines preferably have a polygonal cross section, e.g., octagonal. Matching centering holes 8 in the plunge limiters and cutting-inserts are toleranced to allow a slip fit over the centering pins. The plunge limiters 6 and cutting inserts 5 are preferably mounted alternately on the cutting insert mounting structure 1, although other arrangements are permissable.

Figure 3:
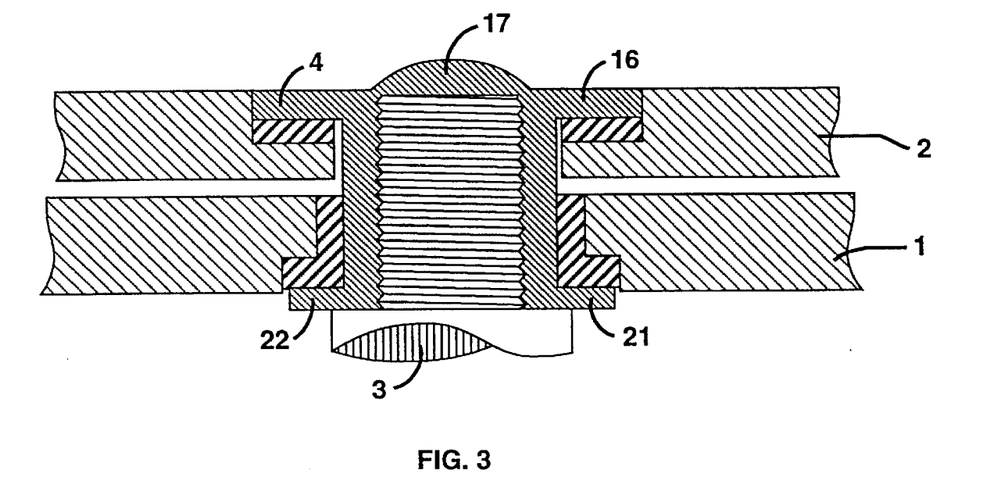
FIG. 3 shows a cross-sectional view of an assembled face planing head through the center of rotation.
Figure 4:
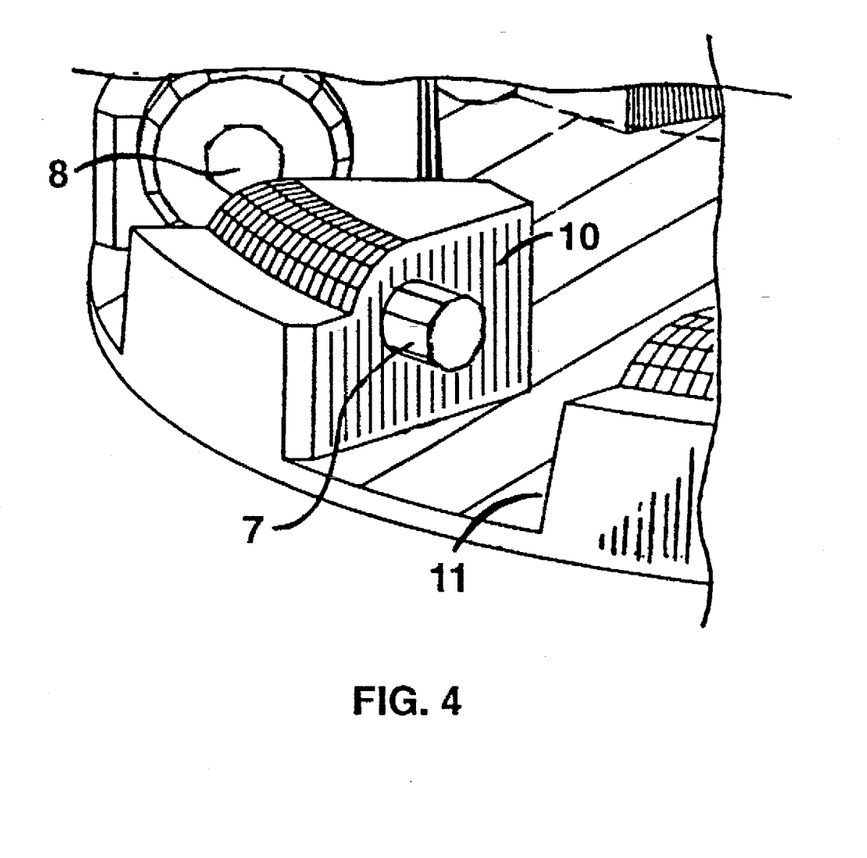
FIG. 4 shows a detail view of the cutting-insert mounting pocket featuring the octagonal cutting-insert positioning and indexing pin.
Figure 5:
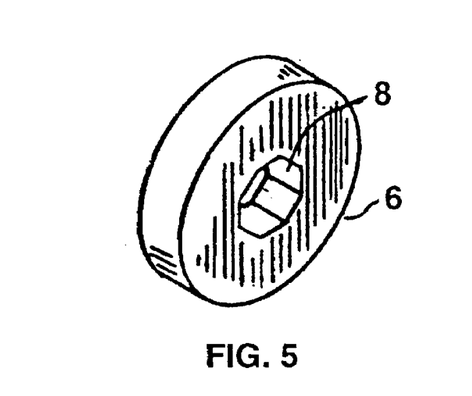
FIG. 5 shows a three-dimensional front elevation of a round plunge limiter.
Figure 6:
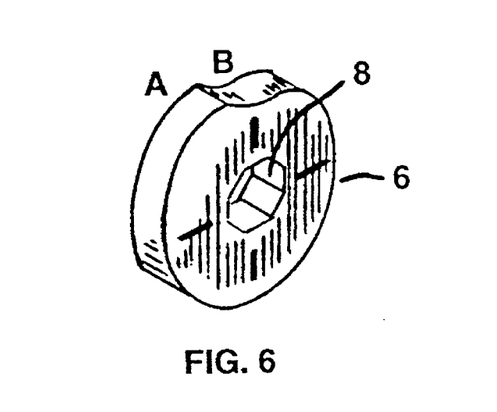
FIG. 6 shows a three-dimensional front elevation of a eccentric-shaped plunge limiter.

Cutting insert mounting structure 1 is substantially disk-shaped and consists of a series of cutting-insert mounting pockets 9 positioned around the outer circumference of the disk. Each pocket has two opposing surfaces. One surface 10 is positioned normal to the plane of the disk and basically on an offset of the radial centerline of the disk. The integral and stationary octagonal cutting-insert indexing and positioning pin 7 is mounted perpendicular to trailing surface 10. When cutting-insert 5 or plunge limiter 6 is installed on indexing and positioning pin 7, a small portion of the diameter of the insert or limiter is exposed on the working surface of the tool. Opposing leading surface 11 is positioned parallel to the surface 10 but canted away at the top, forming a wedging surface to interact with an identical and opposite faces on the cutting-insert holding member. This wedges the inserts into place as the star member is forced closer to the cutting-insert mounting structure by tightening of shaft nut 4 on power unit 3.

Cutting insert holding member 2 preferably is one-piece and is designed to interact with a cutting-insert mounting structure 1. This allows mounted cutting-inserts 5 and plunge limiters 6 to be held securely in place on their centering pins 7 when the head is assembled and secured by shaft nut 4. This is accomplished by a wedging action resulting from the communication between the angled faces 11 incorporated into cutting-insert mounting structure 1 and faces 12 on cutting-insert holding member 2.

A chip-relief groove 13 reduces unnecessary chip wear in front of cutting-inserts 5. The radial protrusions 14 on the cutting insert holding member are designed to deflect as needed during assembly so the position of the clamping surfaces can compensate for tolerance variations in the cutting-insert mounting structure 1, cutting-inserts 5, or plunge limiters 6. A relief 15 may be provided so that shaft nut 4 can be flush-mounted into the cutting-insert holding member. A medium durometer rubber washer 16 preferably is positioned between the bearing surfaces of shaft nut 4 and cutting-insert holding member 2. Rubber washer 16 cooperates with an elastomeric isolation member 22 in the cutting-insert mounting structure to provide mechanical isolation between power unit 3 and cutting edges.

A high point rest 17 consists of a dome-shaped axial protrusion at the center of rotation of the head, providing a positive resting point for the tool when it is in use. The height of this resting point can be adjusted by adding or subtracting washers 18 from beneath the bearing surface of shaft nut 4. Cutting insert 5 is frusto-conical in shape with 360° cutting edge 19 around its perimeter facing the direction of the cut. It preferably has a polygonal centering hole 8 at the axis of rotation for the purpose of (a) holding the piece in place and for, (b) providing multiple independent rotational positions so that the edges can be reindexed when they become dull.

Most cutting applications require four (4) plunge limiters and four (4) cutting-inserts mounted on the assembled cutting head.

There are two types of plunge limiter configurations for the face planing head:

(1) A wear-resistant eccentric-shaped plunge limiter 20 features a consistently increasing radial dimension between point "A" and "B" (FIG. 6), and octagonal centering hole 8 on the axis of rotation. The amount of cutting edge exposed to the cut, and therefore the aggressiveness of the tool, is adjusted by rotating the eccentric limiter (FIG. 6) around octagonal cutting-insert indexing and positioning pin 7.

(2) A concentric disk-shaped plunge limiter 6 (FIG. 5) may be used. The edge exposure of the cutting-inserts are adjusted by exchanging sets of concentric plunge limiters. Several sets of four (4) plunge limiters are available. Each set has a unique radial dimension and the diameter of each set increases incrementally. Disk-shaped plunge limiters have octagonal centering hole 8 allowing them to be indexed around cutting-insert indexing and positioning pin 7 to compensate for diameter loss as they wear during use.

A wear bushing 21 toleranced to allow a slip fit between the interior diameter of the bushing and the threaded shaft of power unit 3 is positioned at the rotational centerline of the cutting-insert mounting structure. Elastomeric isolation member 22 is positioned between center wear bushing 21 and the body of cutting-insert mounting structure 1. The rim of cutting-insert mounting structure 1 and the corresponding rim of cutting-insert holding member 2 shield the edges of the cutting-insert, making the tool non-aggressive and self-guarding from the top and sides.

Although one detailed embodiment of the invention is illustrated in the drawings and previously described in detail, this invention contemplates any configuration and design of components which will accomplish the equivalent result. As an example, the invention is shown as an attachment for a portable grinder, using a commercial grinder spanner nut to secure the cutting-insert holding member to the tool. It may also be adapted to any other shaft for use with any other stationary or portable power unit, and any other securing means. As a further example, the cutting-insert holding member is shown with a wedged face that will cause the cutting-insert holding member to rotate into cutting-inserts as the shaft nut is tightened. In other applications, a simple, non-wedged design could be utilized that blocks the cutting insert into place.

This invention should be considered to include within its scope other related configurations that accomplish similar results. These include rotating cutting tools that utilize two interfitting and substantially disk shaped members; e.g., as shown in FIG. 8. Here cutting insert mounting structure 1a and hold member 2a have been slightly modified so that the cutters can optionally extend beyond both faces of the structure and may also extend beyond the rim.

The angle of a cutting edge may be altered for optimum performance in various materials. As an example, a substantial forward leaning position will cut some materials best and an angular variation relative to a radius of the cutting insert mounting structure may be beneficial. It should be understood that the angles of the cutting insert clamping surfaces would need to be adjusted accordingly. Another important structural variations is shown in FIG. 9. Here the cutting insert holding member 32, 32' has been modified so that the under surface 34 is slightly dished. The upper surface 36 may be machined correspondingly so that thickness of the radial protrusions 14 remains uniform. The exact configuration of the lower surface 34 is not' of critical importance. It has been found convenient to make it frusto-conical from ease of machining but other configurations; e.g., a surface corresponding to a segment of a sphere, are equally suitable. Hinge areas 38 are preferably provided on the radial protrusions and function as will now be explained. When the cutting insert holding member has been placed in position over the lower member it has the configuration shown in the dashed lines of FIG. 9. However, when the retaining nut 4 is tightened into position 4' to force the upper member down to jam the cutting inserts into place, the radial protrusions 14 are forced not only down but outwardly as well by a distance shown by 24. Hinge members 38 may be formed by decreasing the cross section of the radial protrusions. One way of doing this is by machining U-shaped slots in the upper surface 36 of the radial protrusions. When retaining nut 4 is tightened to its operating position 4' the member 32 will be effectively flattened, as a is shown by the solid lines of the figure.

The means for positioning and indexing cutting inserts or plunge limiters is not limited to a center pin 7. Alternatively a formed pocket 26 may be used to hold the cutter insert 5', as is shown in FIG. 10. Here cutting insert mounting pockets 26 are formed into blind pockets 9a by an axially projecting rim 38. The distal surfaces, such as leading surface 12a of radial protrusion 14 may be modified as necessary to achieve the fit required. A cutting insert clamping member, such as is shown in FIG. 9, may advantageously be used with this construction. Using a clamping member of this type, the axial deflection causes the free end of the radial protrusions to move tightly against the corresponding surfaces of the insert mounting pocket 9a and cutting insert 5'. Such outward radial movement causes increased wedging of the insert. Radial loads from centripetal acceleration may further deform the material of the protrusions, further increasing outward radial clamping forces on the inserts.

The invention comprises structures that contribute to powerful clamping pressures on the cutting inserts under static conditions that increase with radial loads resulting from centripetal acceleration. The weight distribution of the radially extending protrusions result in a shift in the neutral axis such that radial centrifugal forces acting on the protrusions cause a moment, forcing the free end of the protrusion axially toward the first disk shaped member increasing clamping forces on the cutting insert 5.

An elastomeric isolation member is used to allow for self leveling of the tool; this is critical to successful adaptation of a non-flexible machine head to a hand-held application. A similar effect could be accomplished by manufacturing the cutting-insert mounting structure and holding member from an elastomeric material, without a separate bushing, or by the use of a metallic spring or mechanical articulating coupling instead of the elastomeric member shown.

To gain certain manufacturing benefits, designing the first or second members in one or more component pieces may be a preferred method of construction. Either the first or second members may be manufactured as two or more interfitted components. For example, it may be desirable to machine the axially projecting rim from tubular material and join it to the body of the cutting head in any known manner to reduce the amount of machining necessary. Functionally, the members would still perform as unitary pieces.

I claim:

1. A rotary tool adopted to hold at least one cutting insert or plunge limiter, said tool having an axis of rotation comprising: a first generally disk shaped member having a plurality of axially projecting rim segments forming a plurality of cutting insert pockets that are generally radially oriented, each pocket comprising a leading and trailing surface oriented at an angle to said plane normal to the axis and extending generally axially to said plane, said member having an outer rim and first and second faces;

a second member having an outer diameter substantially equal to an outer diameter of said first disk shaped member and having a plurality of radially extending protrusions, each protrusion having two surfaces that correspond dimensionally to the cutting insert pockets, one surface engaging surface of a cutting insert pocket and the other surface sized to engage a cutting insert or plunge limiter mounted in a pocket of the first member when said cutting insert or plunge limiter is mounted in said pocket wherein when said first and second disk shaped members are assembled and interfitted with one another, the second disk shaped member will block or wedge cutting inserts or plunge limiters mounted in the cutting insert pockets into place while allowing a portion of the cutting insert to project above at least one face of the tool or beyond said outer rim.

2. The rotary tool of claim 1 which further includes positioning means for positioning and indexing the cutting inserts and plunge limiters in the mounting pockets.

3. The rotary tool of claim 2 in which the positioning means is a center pin.

4. A rotating tool of claim 3 in which the center pin is of polygonal cross section.

5. The rotary tool of claim 2 in which the center pin is inserted into the rim segments generally on a circle drawn about the axis of rotation and is oriented normal to said surface of the rim segment.

6. The rotary tool of claim 2 which further includes cutting inserts and plunge limiters mounted on the positioning means.

7. The rotary tool of claim 6 in which a portion of said cutting inserts or plunge limiters projects above both faces of the assembled tool.

8. The rotary tool of claim 7 in which a portion of said cutting inserts or plunge limiter projects beyond the outer rim of the assembled tool.

9. The rotary tool of claim 6 in which a portion of said cutting inserts or plunge limiters projects beyond the outer rim of the assembled tool.

10. The rotary tool of claim 6 in which the plunge limiters are of substantially annular shape.

11. The rotary tool of claim 6 in which the plunge limiters are eccentrically shaped to permit ready clearance adjustment between the cutting inserts and plunge limiters by rotation about the central axis.

12. The rotary tool of claim 6 in which the plunge limiters lack sufficient relief angle or sharpness for cutting but essentially skid on any surface that they contact.

13. The rotary tool of claim 2 in which the positioning means is a pocket formed in a rim segment of the first member.

14. The rotary tool of claim 1 including a securing means for holding the first and second members together so that the radially extending protrusions of the second member are tightly positioned between the cutting insert or plunge limiters and said cutting insert pocket surfaces when said cutting insert or plunge limiter is mounted in said pocket so as to securely retain the inserts and limiters with the mounting pockets.

15. The rotary tool of claim 14 in which the securing means is a shaft nut for mounting the tool on a shaft of a power unit.

16. The rotary tool of claim 14 in which the securing means has an exterior generally domed shaped surface so that said dome shaped structure protrudes along the axis of the assembled tool in a manner that it may contact a work surface and provide support during operation.

17. The rotary tool of claim 1 in which the radial protrusions on the second member have adequate flexibility to permit sufficient deflection during interfitting of the first and second members to compensate for manufacturing dimensional variations or debris between communicating surfaces.

18. The rotary tool of claim 1 in which the cutting insert mounting pockets on the first member are closed by an upstanding wall at the outer rim to create a plurality of blind pockets, the diameter of the second member being accordingly slightly reduced to accommodate the wall thickness.

19. The rotary tool as described in claim 1 wherein: said second disk shaped member is substantially a shallow dish shape having adequate flexibility to allow deformation during interfitting with said first disk shaped member so that said second member is forced into an essentially planar disk lying substantially on a plane normal to the axial centerline, said deformation acting to force the free ends of the protrusions outwardly into said cutting insert mounting pockets on the first disk.

20. The rotary tool as described in claim 19 in which the radial protrusions have hinge means of sufficient flexibility to allow said deformation.

21. The rotary tool of claim 19 wherein said hinge means are formed by a reduction of the cross section of said protrusion to allow bending.

22. A rotary tool as described in claim 19 wherein: a weight distribution of said radially extended protrusions creates a shift in a neutral axis of the protrusion such that forces resulting from centripetal acceleration during operation create a moment forcing a free end of the protrusion toward said first disk shaped member.

23. The rotary tool of claim 1 wherein the tool is adapted for mounting on the shaft of a power unit.

24. The rotary tool of claim 23 which includes a lateral oscillation isolation means located between the tool and power unit shaft.

25. The rotary tool of claim 23 in which the isolation means is an elastomeric bushing.

26. A rotary tool adopted to hold at least one cutting insert or plunge limiter, said tool having an axis of rotation comprising: a first substantially disk shaped member having a plurality of axially projecting rim segments forming a plurality of cutting insert mounting pockets that are generally radially oriented; each said segment comprising a leading and trailing surface being oriented at an angle to a plane normal to the axis and extending generally axially to said plane;

a second one piece, substantially disk shaped member having an outer diameter substantially equal to an outer diameter of said first disk shaped member, and having a plurality of radially extending protrusions, each protrusion having two facing surfaces that correspond dimensionally and engaging with one of said leading and trailing surfaces of said axially projecting rim segments and a surface of a cutting insert or plunge limiter when said cutting insert or plunge limiter is present wherein said first and second disk shaped members when assembled, are interfitted with one another such that the presence of the second disk will block or wedge a plurality of said cutting insert or plunge limiters into place, allowing a portion of the cutting insert or plunge limiter to project above a face of the tool.

27. A rotary tool as described in claim 26 wherein: said radial protrusions on the second member have adequate flexibility to permit sufficient deflection during interfitting of the first and second members to compensate for manufacturing dimensional variations or debris between said communicating surfaces.

28. A rotary tool as described in claim 26 wherein: the tool is adapted for mounting on a shaft of a power unit and which includes a lateral oscillation isolation means located between the tool and shaft.

29. A rotary tool as described in claim 28 wherein: said isolation means is an elastomeric bushing.

30. A rotary tool as described in claim 28 wherein: said isolation means is a mechanical articulating joint.

31. The rotary tool of claim 26 in which the second member is a shallow dish shape of sufficient flexibility to allow deformation during interfitting with the first member so that said second member is forced into an essentially planar configuration normal to the axial centerline, said deformation forcing the free ends of the radially extending protrusions outward into said cutting insert pockets on the first member.

32. The rotary tool of claim 31 in which each radially extending protrusion has a hinge means giving sufficient flexibility to allow said deformation.

33. The rotary tool of claim 32 where the hinge means is formed by a reduction in cross section of the protrusions.

34. The rotary tool of claim 26 which further includes at least one cutting insert or plunge limiter.

35. A rotary tool as described in claim 34 wherein: a securing means is provided for holding the first and second members together so that the second member is tightly positioned between the cutting inserts and plunge limiters and one of said rim segment leading or trailing surfaces to securely retain the inserts and limiters within said mounting pockets.

36. A rotary tool as described in claim 35 wherein: said securing means is a shaft nut for mounting the tool on a shaft of a power unit, said shaft nut having an exterior generally dome shaped surface so that said dome shaped structure protrudes along the axis of the assembled tool in a manner that it may contact a work surface and provide support during operation.

37. The rotary tool of claim 34 which further includes a means for positioning and indexing the cutting inserts and plunge limiters in the mounting pockets.

38. The rotary tool of claim 37 in which said means for positioning and indexing the cutting insert and plunge limiter is a center pin.

39. The rotary tool of claim 38 in which the center pin is of polygonal cross section.

40. The rotary tool of claim 37 in which said center pin is inserted through the cutting inserts and plunge limiters into the rim segments, generally tangentially to a circle drawn about the axis of rotation.

41. The rotary tool of claim 34 in which the plunge limiters are of substantially annular shape.

42. The rotary tool of claim 34 in which the plunge limiters are eccentrically shaped to permit ready clearance adjustment between the cutting inserts and plunge limiters.

43. The rotary tool of claim 34 in which the plunge limiters lack sufficient relief angle or sharpness for cutting but essentially skid on any surface that they contact.

44. The rotary tool of claim 34 in which the cutting inserts and plunge limiters reconfigured so that the cutting insert will contact a work surface before the non-cutting surface of a plunge limiter, said plunge limiters permitting the cutting insert to cut by preventing them from grabbing or cutting too deeply.

* * * * *